United States Patent
Alakuijala et al.

(10) Patent No.: US 11,734,568 B2
(45) Date of Patent: Aug. 22, 2023

(54) SYSTEMS AND METHODS FOR MODIFICATION OF NEURAL NETWORKS BASED ON ESTIMATED EDGE UTILITY

(71) Applicant: Google LLC, Mountain View, CA (US)

(72) Inventors: Jyrki Alakuijala, Wollerau (CH); Ruud van Asseldonk, Zurich (CH); Robert Obryk, Zurich (CH); Krzysztof Potempa, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 1017 days.

(21) Appl. No.: 16/274,599

(22) Filed: Feb. 13, 2019

(65) Prior Publication Data
US 2019/0251444 A1    Aug. 15, 2019

Related U.S. Application Data

(60) Provisional application No. 62/630,399, filed on Feb. 14, 2018.

(51) Int. Cl.
*G06N 3/082* (2023.01)
*G06N 3/084* (2023.01)
(Continued)

(52) U.S. Cl.
CPC ............ *G06N 3/082* (2013.01); *G06N 3/045* (2023.01); *G06N 3/084* (2013.01); *G06N 20/20* (2019.01)

(58) Field of Classification Search
None
See application file for complete search history.

(56) References Cited

U.S. PATENT DOCUMENTS 11,200,495 B2 * 12/2021 Wang ............... G06N 3/082
2017/0046614 A1 * 2/2017 Golovashkin ........ G06N 3/082
(Continued)

OTHER PUBLICATIONS

Ng, Andrew. "Sparse autoencoder." 2015. Wayback Machine. 19 pages. URL: https://web.archive.org/web/20150219073254/https://web.stanford.edu/class/cs294a/sparseAutoencoder_2011new.pdf (Year: 2015).*

(Continued)

*Primary Examiner* — Abdullah Al Kawsar
*Assistant Examiner* — Asher H. Jablon
(74) *Attorney, Agent, or Firm* — Dority & Manning, P.A.

(57) ABSTRACT

The present disclosure provides systems and methods for modification (e.g., pruning, compression, quantization, etc.) of artificial neural networks based on estimations of the utility of network connections (also known as "edges"). In particular, the present disclosure provides novel techniques for estimating the utility of one or more edges of a neural network in a fashion that requires far less expenditure of resources than calculation of the actual utility. Based on these estimated edge utilities, a computing system can make intelligent decisions regarding network pruning, network quantization, or other modifications to a neural network. In particular, these modifications can reduce resource requirements associated with the neural network. By making these decisions with knowledge of and based on the utility of various edges, this reduction in resource requirements can be achieved with only a minimal, if any, degradation of network performance (e.g., prediction accuracy).

15 Claims, 6 Drawing Sheets

(51) Int. Cl.
  *G06N 20/20* (2019.01)
  *G06N 3/045* (2023.01)

(56) References Cited

U.S. PATENT DOCUMENTS

2018/0114114 A1* 4/2018 Molchanov ............ G06N 3/045
2018/0285736 A1* 10/2018 Baum ................... G06N 3/0454
2021/0182683 A1* 6/2021 Dai ....................... G06N 3/0454

OTHER PUBLICATIONS

Sadowski, Peter. "Notes on Backpropagation." 2016. Wayback Machine. 4 pages. URL: https://web.archive.org/web/20161003084239/ htttps://www.ics.uci.edu/~pjsadows/notes.pdf (Year: 2016).*
Kauschke et al. "Batchwise Patching of Classifiers." Feb. 2-7, 2018. AAAI'18/IAAI'18/EAAI'18, Article No. 413, pp. 3374-3381 (Year: 2018).*
Bellec et al. "Deep Rewiring: Training very sparse deep networks." Feb. 5, 2018. arXiv:1711.05136v4 [cs.NE], 25 pages (Year: 2018).*
Mochanov et al. "Pruning Convolutional Neural Networks For Resource Efficient Inference."2017. arXiv:1611.06440v2 [cs.LG], 17 pages (Year: 2017).*
Dong et al., "Learning to Prune Deep Neural Networks via Laverwise Optimal Brain Surgeon". arXiv:1705.075652, Nov. 9, 2017, 15 pages.
Han et al., "Deep Compression: Compressing Deep Neural Networks with Pruning, Trained Quantization and Huffman Coding", arXiv:1510.00149v3, Nov. 20, 2015, 13 pages.
Hassibi et al., "Second Order Derivatives for Network Pruning: Optimal Brain Surgeon", Advances in Neural Information Processing Systems, Denver, Colorado, Nov. 30-Dec. 3, 1992. pp. 164-171.
LeCun et al., "Optimal Brain Damage", Advances in Neural Information Processing Systems, Denver, Colorado, Nov. 27-30, 1989, pp. 598-605.
Zoph et al., "Learning Transferable Architectures for Scalable Image Recognition", arXiv:1707.07012v3, Dec. 1, 2017, 14 pages.

* cited by examiner

SYSTEMS AND METHODS FOR MODIFICATION OF NEURAL NETWORKS BASED ON ESTIMATED EDGE UTILITY

PRIORITY CLAIM

The present application is based on and claims Priority to U.S. Provisional Application 62/630,399 having a filing date of Feb. 14, 2018, which is incorporated by reference herein.

FIELD

The present disclosure relates generally to machine learning. More particularly, the present disclosure relates to systems and methods for modification (e.g., pruning, compression, quantization, etc.) of artificial neural networks based on estimations of the utility of network connections generated, for example, using a novel edge utility estimation heuristic.

BACKGROUND

Artificial neural networks ("neural networks") are used extensively and can help in solving a variety of tasks that have traditionally been difficult for a computing system. However, neural networks can consume significant memory and compute resources. For example, large neural networks can consume significant memory when stored, significant compute resources when inference is performed, and/or significant communication resources (e.g., bandwidth) when transmitted over a network. Larger neural networks also consume relatively more resources than smaller networks when being trained.

Specifically, neural nets are computed using multiplication and accumulation (also known as "multiply-adds"). Each multiplication and accumulation operation requires time and uses energy for the computation. Likewise, the value(s) associated with each multiplication and accumulation require storage space and increase transfer time of the models (for example from server to a mobile phone).

As such, to make neural networks more appealing and practical for use in resource-constrained environments such as mobile devices (e.g., smartphones) and/or for transmission across bandwidth-limited networks, ways are needed to reduce the cost of transfer, storage, and use of neural networks. In particular, techniques are needed for reducing network size without significantly degrading prediction performance.

One possible way to reduce network size is to remove (i.e., "prune") edges that do not significantly contribute to prediction performance. For example, in some instances, edges can be "removed" by setting their weight to zero. In particular, a sparse weight matrix can be stored in less memory and removing an edge eliminates one multiply-add operation from evaluation. From a mathematical viewpoint, if a multiplier can be replaced by zero, the multiply-add doesn't need to be performed. Thus, it is favorable to leave out unnecessary computations.

Certain existing approaches for pruning neural networks use the absolute value of an edge's weight when deciding whether to prune the edge. For example, if weights are within range [4.0, . . . , 1.0], then one example pruning algorithm may identify all weights with values within [−0.05 to 0.05] and replace such values with zeros.

However, this approach undesirably focuses on the weight associated with the edge, rather than the actual utility provided by the edge (e.g., the actual contribution towards correct predictions). In turn, directly computing the utility of an edge is computationally expensive, as it typically requires a full evaluation of the network both with and without the edge.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method. The method includes obtaining, by one or more computing devices, data descriptive of a machine-learned neural network. The machine-learned neural network includes a plurality of neurons respectively connected by a plurality of edges. A plurality of weights are respectively associated with the plurality of edges. The method includes, for at least one edge of the plurality of edges: determining, by the one or more computing devices, an estimated utility of the edge; and determining, by the one or more computing devices, whether to adjust the weight associated with the edge based at least in part on the estimated utility of such edge.

Another example aspect of the present disclosure is directed to a computer system. The computer system includes one or more processors and one or more non-transitory computer-readable media that collectively store instructions that, when executed by the one or more processors, cause the computer system to perform operations. The operations include obtaining data descriptive of a machine-learned neural network. The machine-learned neural network includes a plurality of neurons respectively connected by a plurality of edges. The operations include determining a respective estimated utility of each of the plurality of edges. The operations include selecting one or more edges for deletion based at least in part on the respective estimated utility of each of the plurality of edges. The operations include deleting the selected one or more edges.

Another example aspect of the present disclosure is directed to one or more non-transitory computer-readable media that collectively store instructions that, when executed by one or more processors, cause the one or more processors to perform operations. The operations include obtaining data descriptive of a machine-learned neural network. The machine-learned neural network includes a plurality of neurons respectively connected by a plurality of edges. A plurality of weights are respectively associated with the plurality of edges. The operations include determining a plurality of different proposed quantization schemes. Each proposed quantization scheme includes changes to the respective weight of one or more edges to be quantized under such scheme. The operations include estimating a change in loss for each of the plurality of different proposed quantization schemes. Estimating the change in loss for each proposed quantization scheme includes determining an estimated change in utility of each edge to be quantized. The operations include selecting one of the proposed quantization schemes based at least in part on the estimated changes in loss. The operations include applying the selected quantization scheme to the machine-learned neural network. Applying the selected quantization scheme includes changing the respective weight of the one or more edges to be quantized under such scheme.

Other aspects of the present disclosure are directed to systems, apparatus, tangible, non-transitory computer-readable media, user interfaces, and devices for performing aspects of the present disclosure.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
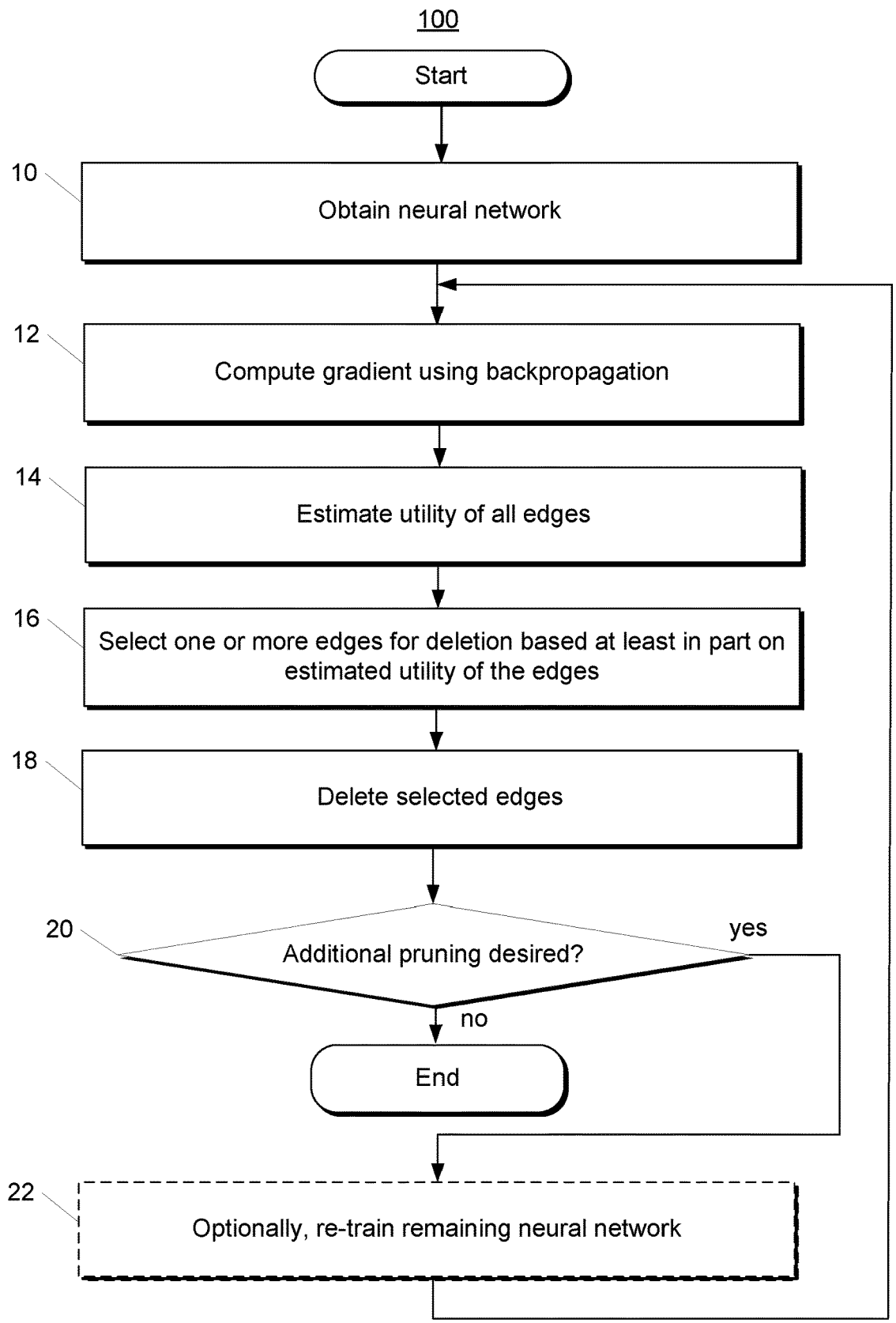
FIG. 1 depicts a flow chart diagram of an example method to modify a neural network according to example embodiments of the present disclosure.

Reference numerals that are repeated across plural figures are intended to identify the same features in various implementations.

DETAILED DESCRIPTION

Overview

Example aspects of the present disclosure are directed to systems and methods for modification (e.g., pruning, compression, quantization, etc.) of artificial neural networks based on estimations of the utility of network connections (also known as "edges"). In particular, the present disclosure provides novel techniques for estimating the utility of one or more edges of a neural network in a fashion that requires far less expenditure of resources than calculation of the actual utility. Based on these estimated edge utilities, a computing system can make intelligent decisions regarding network pruning, network quantization, or other modifications to a neural network. In particular, these modifications can reduce resource requirements associated with the neural network (e.g., reduce its storage size, transfer size, compute requirements, etc). By making these decisions with knowledge of and based on the utility of various edges, this reduction in resource requirements can be achieved with only a minimal, if any, degradation of network performance (e.g., prediction accuracy).

More particularly, a computing system can obtain data descriptive of a neural network. Example neural networks include feed-forward neural networks, recurrent neural networks, spiking neural networks, convolutional neural networks, layered or non-layered neural networks, or other forms of neural networks.

A neural network can include a number of neurons that are connected by respective edges. The neurons can be arranged into a number of layers, kernels, or other structures. A weight can be associated with each edge. In some instances, training a neural network can include modifying the respective weights associated with the edges to optimize (e.g., minimize) a loss function that evaluates a performance of the neural network on a set of training data.

More particularly, prediction performance of a neural network can be quantified by a loss function. Let $T \subseteq \mathbb{R}^k \times \mathbb{R}^m$ be a set of labelled examples, and let $w \in \mathbb{R}^k$ be the vector of network parameters (e.g., the weights associated with the edges). Let a loss function $\mathcal{L}: \mathbb{R}^k \times \mathbb{R}^n \times \mathbb{R}^m \to \mathbb{R}_{\geq 0}$ be given. The total loss $\mathcal{L}_T$ over T is given by $$\mathcal{L}_T(w) = \Sigma_{(x,y) \in T} \mathcal{L}(w,x,y)$$

Each edge of the neural network can have an associated utility. For example, the utility of an edge can refer to, measure, or otherwise represent an amount by which the edge contributes to correct predictions provided by the neural network. In some instances, an edge's utility can be measured as the difference between a loss function evaluated after removing the edge from the network (e.g., by setting the weight of the edge to zero) and the loss function evaluated relative to the network including the edge. That is, the utility of an edge can describe a difference in network performance with and without the edge.

As one example notation, define $\hat{w}_i$ as w with the i-th element set to 0. The utility of the i-th parameter, $u_i$, can be defined as follows:

$$u_i = \mathcal{L}_T(\hat{w}_i) - \mathcal{L}_T(w)$$

In some instances, an edge's utility can be normalized by dividing the utility function immediately above by the baseline network performance (e.g., the loss function evaluated relative to the network including the edge). Thus, the normalized utility can equal $u_i / \mathcal{L}_T(w)$.

As described above in the Background section, one possible way to reduce network size is to remove (i.e., "prune") edges that do not significantly contribute to prediction performance. Thus, generally speaking, the edge(s) that are the best candidate(s) for removal are the edge(s) whose weight has the smallest utility, as defined above. However, computing the utility directly is expensive as it requires a full evaluation of the network. Therefore, computing the exact utility of an edge is prohibitively expensive and impractical.

According to an aspect of the present disclosure, a computing system can estimate the utility of an edge of the neural network rather than directly computing the actual utility. For example, the computing system can estimate the utility of an edge based on a simplified derivative of the weight of such edge. Estimating the utility of an edge in this fashion greatly reduces the resource expenditure required to obtain an indication of the edge's utility, even if the indication is only an estimate, thereby enabling network modification decisions (e.g., pruning, quantization, etc.) to be made on the basis of edge utility rather than, for example, magnitude of the edge's weight.

In particular, the computing system can determine whether to adjust the weight associated with the edge based at least in part on the estimated utility of such edge. For example, adjusting the weight can include setting the weight to zero or modifying the weight according to a quantization scheme. Further, in various implementations, additional network modification algorithms can be performed which make intelligent modification decisions on the basis of the estimated utility of the edges.

As one example, in some implementations, the computing system can determine the estimated utility of the edge based at least in part on a first-order approximation of a loss function at the weight associated with the edge. For example, using the first-order approximation of the loss function can enable the computing system to discard or otherwise disregard higher order terms in the approximation of the loss function. Thus, the estimated utility can be easily determined from the first-order approximation, without requiring complex computation to obtain any higher order terms which are expected to be small.

In particular, in some implementations, the computing system can determine the estimated utility of the edge by determining a first derivative of a loss function with respect to a logit of a receiving neuron at the weight associated with the edge, but without determining any higher-order derivatives of the loss function. For example, the edge can extend from a transmitting neuron to a receiving neuron and the utility of the edge can be determined based on the first derivative of the loss function with respect to the logit of the receiving neuron at the weight associated with the edge.

As one example, in some implementations, the computing system can determine the estimated utility of the edge by determining a sum over one or more training examples included in a training dataset of a proposed change in the weight multiplied by an output of the transmitting neuron multiplied by the first derivative of the loss function with respect to the logit of the receiving neuron at the weight and training example. In one example, the proposed change in the weight can equal the negative of the weight's value if the full utility of the edge is being estimated (e.g., for use in pruning or removal decisions). In another example, the proposed change in the weight can equal a proposed change in the value of the weight under a proposed quantization scheme.

One particular example heuristic for estimating edge utility is described in further detail below.

In some implementations, the computing system can determine whether to prune an edge based at least in part on the estimated utility of the edge. As one example, in some implementations, the computing system can determine the estimated utility of some or all edges in a neural network. The computing system can select one or more edges for removal based on their respective estimated utilities. For example, a certain number of edges with the smallest estimated utility can be removed. As another example, a certain percentage of edges with the smallest estimated utility can be removed. As yet another example, any edges that have an estimated utility that is less than a threshold value can be removed.

In some implementations, removing/pruning an edge can include setting its associated weight to zero. In other implementations, removing/pruning an edge can include removing the edge from the network altogether (e.g., by using some different sparse representation where the edge is not there at all). Removing the edge altogether can save on computation. In yet other implementations, removing/pruning an edge can include removing one or both of the associated neurons (e.g., the transmitting neuron and/or the receiving neuron) from the neural network. While this is typically easier to do than eliminating specific edges, it has a more drastic effect on network performance.

In some implementations, after pruning one or more edges, a computing system can supplement the neural network with at least one additional edge at a different location within the neural network. For example, in a network where the number of edges is limited or fixed, the computing system can add one edge for each edge that is pruned. This can result in a network of fixed sparsity which still evolves and improves performance over a number of pruning/supplementing iterations. In particular, at each iteration, the lowest performing edges can be identified, removed, and then allocated to other locations within the network.

Any number of different heuristics or techniques can be used to determine where to add the supplemental connections. As one example, in some implementations, supplementing the neural network with at least one additional edge can include adding a patch subnetwork to the neural network, wherein the patch subnetwork is trained to predict an error associated with its input. For example, a computing system can choose (e.g., randomly or according to some heuristic) a small subset of neurons to be used as input for an additional patch neural network. The patch neural network can be trained to predict an error it sees from its input. This process can be performed for a number of iterations (e.g., 10,000) and the patch networks that demonstrate the best performance can be selected and included in the overall neural network. However, in other implementations, the computing system can remove edges without adding any supplemental edges.

In some implementations, once an edge of a neuron (e.g., the transmitting neuron and/or the receiving neuron) has been modified in some way (e.g., pruned), the computing system can exempt any other edges associated with that neuron (e.g., the transmitting neuron and/or the receiving neuron) from any further modification (e.g., pruning). Thus, in some implementations, once an edge is removed from a neuron, no other edges associated with that neuron will be modified. More particularly, in some implementations, once an edge is removed from a neuron, no other edges associated with that neuron will be modified during a current pruning iteration while, in other implementations, once an edge is removed from a neuron, no other edges associated with that neuron will be modified during the current or any subsequent pruning iterations.

In some implementations, the computing system can select one of two or more proposed quantization schemes based at least in part on the estimated utility of the edges. For example, quantizing the weights of the neural network can result in lower storage space or transmission bandwidth requirements since compression gains can be achieved. As one example, quantizing the weights of the neural network can result in compute costs being reduced by enabling use of integer operations rather than floating-point operations. Integer operations are typically less expensive than their floating-point counterparts. Using integer operations can also be called fixed-point arithmetic, as opposed to floating-point arithmetic. As another example, because of the smaller memory footprint of quantized values, more values can be transferred from memory to the processor in the same time, and the cache on the processor can store more values, so there is less need to load values from memory in the first place. This reduces the transfer cost per value.

More particularly, according to an aspect of the present disclosure, a computing system can determine a plurality of different proposed quantization schemes for a neural network. Each proposed quantization scheme can include changes to the respective weight of one or more edges to be quantized under such scheme. The computing system can estimate a change in loss for each of the plurality of different proposed quantization schemes. In particular, estimating the change in loss for each proposed quantization scheme can include determining an estimated change in utility of each edge to be quantized. For example, the change in loss for a proposed quantization scheme can be the sum of the changes in utility for all edges to be quantized under such scheme.

The computing system can select one of the proposed quantization schemes based at least in part on the estimated changes in loss. For example, the computing system can select the proposed quantization scheme that best balances change in loss (e.g., performance degradation) versus resource savings (e.g., memory footprint). The computing system can apply the selected quantization scheme to the machine-learned neural network. In particular, applying the selected quantization scheme can include changing the respective weight of the one or more edges to be quantized under such scheme.

In some implementations, quantization can occur over a number of iterations. For example, at each iteration, the 'best' quantization scheme can be selected and applied to a subset of parameters, and, optionally the un-quantized parameters of the network can be retrained. At the next iteration, quantization schemes can be proposed and evaluated for a subset of the remaining un-quantized parameters of the network.

In some implementations, the computing system can select one of the proposed quantization schemes according to or based on a rate distortion curve. For example, the rate distortion curve can describe an optimal gain in compression for every given increase in loss.

In some implementations, the computing system can select one of the proposed quantization schemes according to or based on sensitivity values of the weights, where the sensitivity of a weight is equal to its utility divided by the magnitude of the weight. For example, the weights with smallest sensitivity can be quantized first or a quantization scheme with the smallest associated cumulative sensitivity can be applied first.

In some instances, utility can be expressed as a negative value. In some of such instances, for example when used in conjunction with quantization decisions, the sum of absolute values of the utilities or changes in utility can be used.

The systems and methods of the present disclosure provide a number of technical effects and benefits. As one example, modifications (e.g., pruning or quantization) to neural networks as described herein can reduce the resource consumption of the neural network. For example, modifications to the neural network can reduce its storage size, transfer size, compute requirements, training time, etc. Conversely, the smaller network size also makes the neural networks faster to run.

Thus, the systems and methods described herein allow for increased use of machine learned-models in bandwidth-limited networks and/or resource-constrained environments, such as mobile computing, where the machine learned-models can provide benefits to a variety of user applications. Additionally, the systems and methods described herein may also provide a technical effect and benefit of reducing update size and improving performance due to reducing cache and memory bandwidth requirements.

Furthermore, by making modification decisions with knowledge of and based on the utility of various edges, the reduction in resource usage described above can be achieved with only a minimal, if any, degradation of network performance (e.g., prediction accuracy). Thus, the systems and methods of the present disclosure enable neural networks with improved resource usage characterizes and with similar performance outcomes to larger-sized networks.

The systems and methods described herein also provide resulting improvements to computing technology tasked with the distribution and use of machine-learned models. For example, through the use of advanced compression techniques for machine-learned model distribution as described herein, computing systems may optimize bandwidth use and reduce transfer costs and more efficiently provide machine-learned models for use in various applications, such as mobile applications. Further, the systems and methods described herein may provide reductions in storage requirements and system resources, thus making machine-learned models more appealing in limited-bandwidth networks.

Example Heuristic for Estimating Utility

Suppose edge i connects neuron p to neuron q. Denote by $a_p$, $a_q$ their logits, and by $\sigma(a_p)$, $\sigma(a_q)$ their output. We have:

$$a_q = w_i \sigma(a_p) + R$$

where R is some residual that does not depend on $w_i$ or $a_p$. As one example, R can be the weighted sum over incoming edges of neuron q other than i plus the bias at neuron q.

Assuming $\mathcal{L}$ and $\sigma$ are infinitely differentiable, $\partial \mathcal{L}/\partial a_q$ can be computed at (w,x,y) for every (x,y) ∈ T. Note that this value is typically computed anyway as part of the computation of $\partial \mathcal{L}/\partial w_i$ for the weight update during the regular learning process. In practice, in some instances, a weaker assumption, such as assuming that $\mathcal{L}$ and $\sigma$ are "piecewise differentiable" is sufficient to apply the example heuristic.

According to an aspect of the present disclosure, a first-order approximation of $\mathcal{L}$ in (w,x,y) can be used to estimate $\mathcal{L}(\hat{w}_i, x, y)$:

$$\mathcal{L}(\hat{w}_i, x, y) = \mathcal{L}(w, x, y) - w_i \frac{\partial \mathcal{L}}{\partial w_i}\bigg|_{(w,x,y)} + O(w_i^2)$$

where $$\frac{\partial \mathcal{L}}{\partial w_i} = \sigma(a_p) \frac{\partial \mathcal{L}}{\partial a_q}$$

It follows that $$u_i = \sum_{(x,y) \in T} -w_i \sigma(a_p) \frac{\partial \mathcal{L}}{\partial a_q}\bigg|_{(w,x,y)} + O(w_i^2)$$

By discarding the right-hand term, we get an approximation $\tilde{u}_i$ of $u_i$ that can be used as an estimated utility. That is:

$$\tilde{u}_i = \sum_{(x,y) \in T} -w_i \sigma(a_p) \frac{\partial \mathcal{L}}{\partial a_q}\bigg|_{(w,x,y)} \quad \text{Eq. (1)}$$

One thing to note is that in an optimum, $\partial \mathcal{L}_T/\partial w_i$ and $\partial \mathcal{L}_T/\partial a_q$ are 0. However, w is typically not an optimum when the example heuristic is applied and, therefore, $\tilde{u}_i$ will not be zero.

Additionally, the estimated utility described above in Equation 1 can be generalized to estimate a change in utility of an edge i according to various proposed changes to the value of the weight $w_i$ (e.g., changes other than simply setting $w_i$ to zero such as, for example, quantization changes). As one example, this estimated change in utility can be expressed as follows:

$$\Delta \tilde{u}_i = \sum_{(x,y) \in T} \Delta w_i \sigma(a_p) \frac{\partial \mathcal{L}}{\partial a_q}\bigg|_{(w,x,y)}$$

where $\Delta w_i$ corresponds to the proposed change in the value of $w_i$. For example, $\Delta w_i$ can be expressed as $\Delta w_i = w_{proposed} - w_{current}$. For instances where the proposed change is to set $w_i$ to zero, $\Delta w_i = 0 - w_i$, which renders the specific expression provided in Equation 1.

Example Methods

Figure 2:
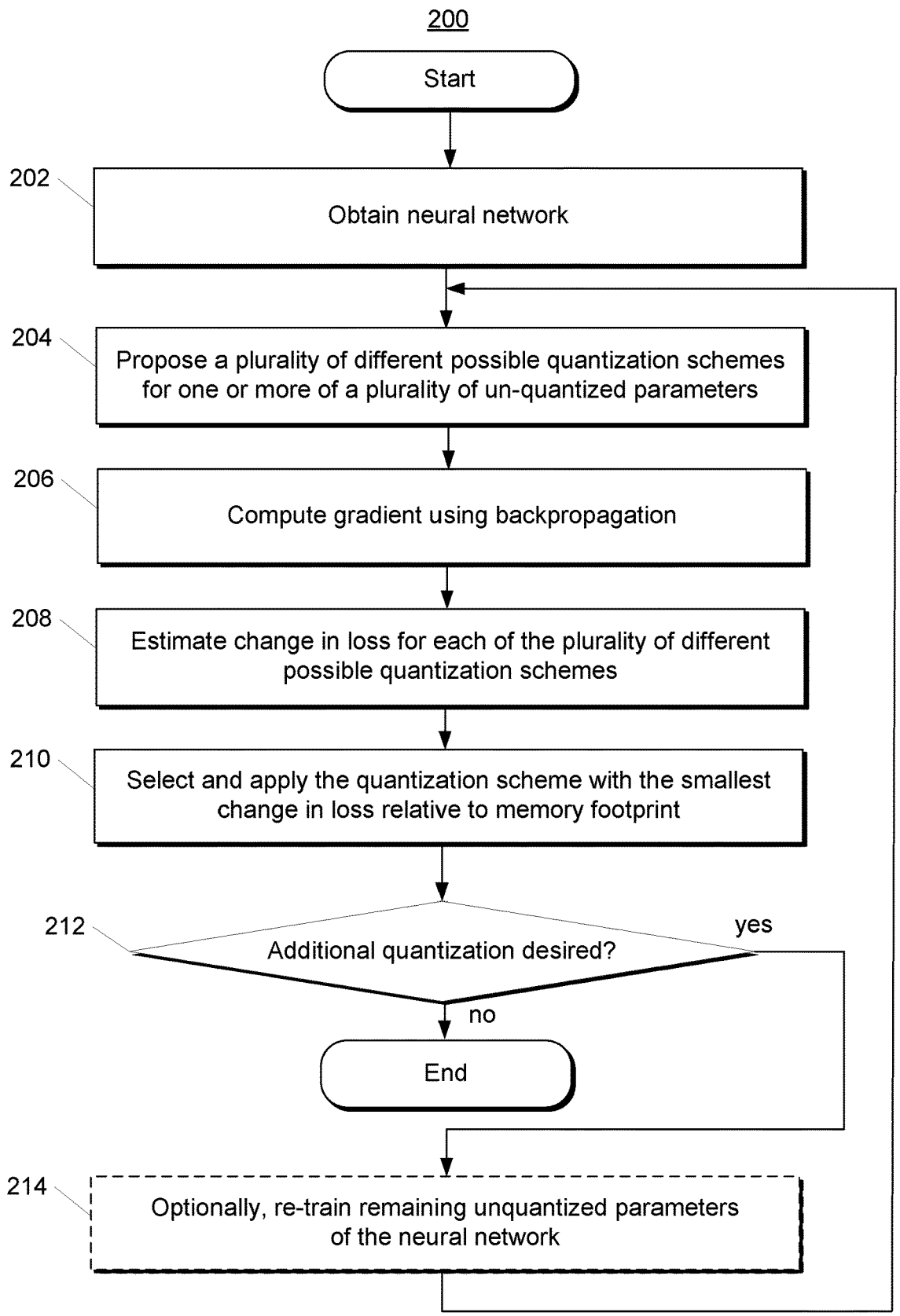
FIG. 2 depicts a flow chart diagram of an example method to modify a neural network according to example embodiments of the present disclosure.
Figure 3:
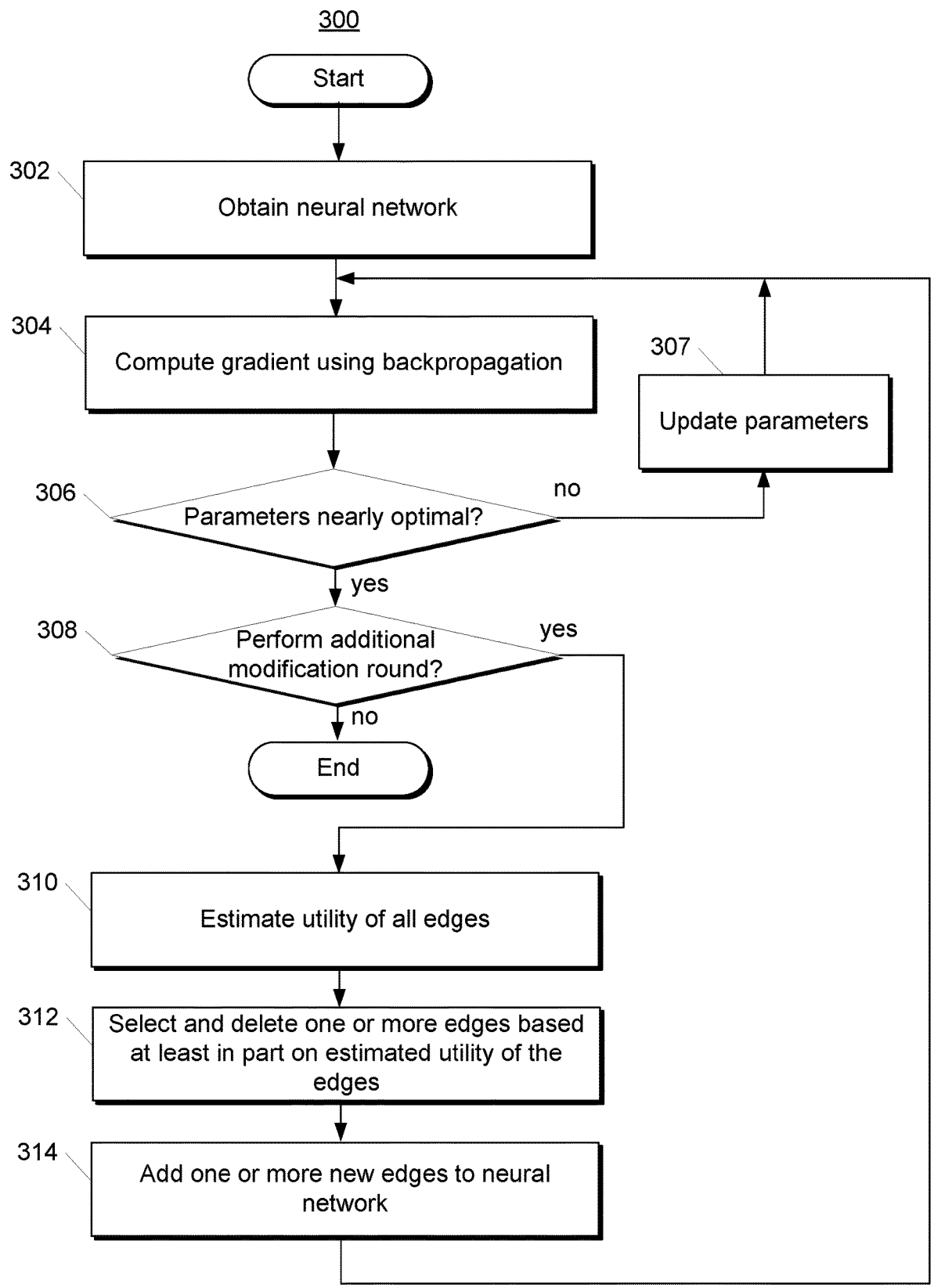
FIG. 3 depicts a flow chart diagram of an example method to modify a neural network according to example embodiments of the present disclosure.

FIGS. 1-3 depict flow chart diagrams of example methods to modify a neural network according to example embodiments of the present disclosure. Although each of FIGS. 1-3 depicts steps performed in a particular order for purposes of illustration and discussion, the methods of the present disclosure are not limited to the particularly illustrated order or arrangement. The various steps of each of methods 100, 200, and 300 can be omitted, rearranged, combined, and/or adapted in various ways without deviating from the scope of the present disclosure.

Referring first to FIG. 1, FIG. 1 shows an example method 100 to prune a neural network.

At 10, a computing system can obtain data descriptive of a neural network. For example, the neural network can be a fully-connected neural network. The neural network can have been previously trained (e.g., to convergence) based on a training dataset.

To provide one example, a part of an example neural network might include three neurons: neuron 1, neuron 2, and neuron 3. The example neurons are connected by two edges: edge 1→3 with associated weight $w_1 = 1.4$, and edge 2→3 with associated weight $w_2 = -4.5$. The weights $w_1$ and $w_2$ are parameters of the network.

Referring again to FIG. 1, at 12, the computing system can compute a gradient using backpropagation. For example, the gradient of the loss function can be computed. In some implementations, computing the gradient can include determining the derivative of the loss with respect to the weight of each edge. (The combination of the derivatives of the loss with respect to all weights can be referred to as the gradient of the loss.)

To continue the example provided above with the two example edges, the computing system can compute $\partial \mathcal{L}_T / \partial w_1$, the derivative of the loss $\mathcal{L}_T$ with respect to $w_1$, and $\partial \mathcal{L}_T / \partial w_2$, the derivative of the loss $\mathcal{L}_T$ with respect to $w_2$, at the point $w_1 = 1.4$, $w_2 = -4.5$.

In this example, the computing system might determine that:

$$\frac{\partial \mathcal{L}}{\partial w_1}\bigg|_{w_1=1.4, w_2=-4.5} = -16.7$$

$$\frac{\partial \mathcal{L}}{\partial w_2}\bigg|_{w_1=1.4, w_2=-4.5} = 0.3$$

where the bar followed by subscripts means "at the point". The numbers in this example are provided as examples only; in reality the values are computed from the particular network weights and training data using backpropagation.

At 14, the computing system can estimate the utility of all edges in the network. For example, the computing system can estimate the utility of all edges using the gradient computed at 12. As one example, the computing system can use the utility estimation heuristic described above to compute the utility for all edges (e.g., using Eq. (1)).

To continue the example provided above with the two example edges, the computing system can compute $\tilde{u}_1$, an estimate of the utility of edge 1→3, and $\tilde{u}_2$, an estimate of the utility of edge 2→3, as follows:

$$\tilde{u}_1 = -w_1 \cdot -16.7 = -1.4 \cdot -16.7 = 23.38$$

$$\tilde{u}_2 = -w_2 \cdot 0.3 = 4.5 \cdot 0.3 = 1.35$$

Thus, the estimated utilities indicate that edge 2→3 has the lower utility of the two edges.

Referring again to FIG. 1, at 16, the computing system can select one or more edges for deletion based at least in part on the estimated utility of the edges. For example, a certain number of edges with the smallest estimated utility can be removed. As another example, a certain percentage of edges with the smallest estimated utility can be removed. As yet another example, any edges that have an estimated utility that is less than a threshold value can be removed.

To continue the example provided above, if one of the two edges needs to be selected for deletion, then the edge 2→3 can be selected since it has the lower estimated utility, while edge 1→3 can be kept. This result demonstrates one benefit of the estimated utility techniques described herein. In particular, while certain existing algorithms may have selected the edge 1→3 for pruning because the magnitude of its weight $w_1$ (1.4) was smaller than the magnitude of weight $w_2$ (4.5), the estimated utility heuristic described herein enables the computing system to discern that, in fact, the edge 1→3 has greater utility, despite its weight having a smaller magnitude.

Referring again to FIG. 1, at 18, the computing system can delete the selected edges. For example, deleting an edge can include settings its associated weight to zero.

At 20, the computing system can determine whether additional pruning is desired. For example, one or more additional rounds of pruning can be performed until the neural network meets one or more criteria such as: requires a memory allocation below a certain amount; requires less than a certain amount of floating point operations per run; requires less than a certain amount of multiply-adds to run; has a network size that is smaller than an original network size by a certain percentage; has a certain sparsity amount; and/or other criteria.

If it is determined at 20 that no additional pruning is desired, then method 100 can end. However, if it is determined at 20 that additional pruning is desired, then method 100 can optionally go to block 22, or, in other implementations, can simply return directly to block 12.

At 22, the computing system can re-train the remaining neural network (e.g., until convergence). After 22, the method 100 can return to block 12.

FIG. 2 shows an example method 200 to quantize a neural network.

At 202, a computing system can obtain data descriptive of a neural network. For example, the neural network can be a fully-connected neural network. The neural network can have been previously trained (e.g., to convergence) based on a training dataset.

As one example, assume the same example (sub)network structure described above with three neurons and two edges: edge 1→3 with weight $w_1 = 1.4$, and edge 2→3 with weight $w_2 = -4.5$.

At 204, the computing system can propose or otherwise obtain a plurality of different possible quantization schemes for one or more of a plurality of un-quantized parameters of the neural network. The quantization schemes can be proposed or developed according to any possible techniques.

To provide an example, a first example quantization might include rounding all weights to multiples of 1.2, while a second example quantization might include rounding all weights to multiples of 4.0.

Denote by $\Delta w_1$ and $\Delta w_2$ the change in $w_1$ and $w_2$ due to rounding. For the first example quantization scheme (multiples of 1.2):

$$\Delta w_1 = 1 \cdot 1.2 - w_1 = 1.2 - 1.4 = -0.2$$

$$\Delta w_2 = -4 \cdot 1.2 - w_2 = -4.8 + 4.5 = -0.3$$

For the second example quantization scheme (multiples of 4.0):

$$\Delta w_1 = 0 \cdot 4.0 - w_1 = 0.0 - 1.4 = -1.4$$

$$\Delta w_2 = -1 \cdot 4.0 - w_2 = -4.0 + 4.5 = 0.5$$

At 206, the computing system can compute a gradient using backpropagation. For example, the gradient of the loss function can be computed. In some implementations, computing the gradient can include determining the derivative of the loss with respect to the weight of each edge. (The combination of the derivatives of the loss with respect to all weights can be referred to as the gradient of the loss.)

At 208, the computing system can estimate a change in loss for each of the plurality of different possible quantization schemes.

To continue the particular example, the computing system can compute the derivatives of the loss with respect to $w_1$ and $w_2$ at the point $w_1=1.4$ and $w_2=-4.5$. Multiplying these derivatives with $\Delta w_1$ and $\Delta w_2$ gives an estimate of the change in loss due to the proposed rounding of $w_1$ and $w_2$. The utility heuristic can be seen as a special case of rounding weights to zero.

The computing system can sum the estimated changes in loss due to each weight, to estimate the combined effect of rounding both weights. For the first proposal (multiples of 1.2):

$$\Delta w_1 \cdot -16.7 + \Delta w_2 \cdot 0.3 = -0.2 \cdot -16.7 - 0.3 \cdot 0.3 = 3.25$$

For the second proposal (multiples of 4.0):

$$\Delta w_1 \cdot -16.7 + \Delta w_2 \cdot 0.3 = -1.4 \cdot -16.7 + 0.5 \cdot 0.3 = 23.53$$

At 210, the computing system can select and apply the quantization scheme with the smallest change in loss relative to memory footprint. To continue the example, the estimated change in loss is lowest for the first proposal. However, the second proposal has a smaller memory footprint: 0 and −1 can be stored with less bits than 1 and −4. Thus, in some implementations, the computing system is configured to make a trade-off between increase in loss and memory footprint. For example, if the lower increase in loss outweighs the higher memory footprint, computing system applies the first proposal. However, other logic for selecting between proposed quantization schemes based on estimated change in loss can be used alternatively to selecting the quantization scheme with the smallest change in loss relative to memory footprint.

At 212, the computing system can determine whether additional quantization is desired. For example, one or more additional rounds of quantization can be performed until the neural network meets one or more criteria such as: requires a memory allocation below a certain amount; requires less than a certain amount of floating point operations per second (FLOPS) to run; requires less than a certain amount of multiply-adds to run; has a network size that is smaller than an original network size by a certain percentage; has a certain quantization amount; until a quantization loss exceeds a certain amount; until a certain number or percentage (e.g., all) of the parameters have been quantized; and/or other criteria.

If it is determined at 212 that no additional quantization is desired, then method 200 can end. However, if it is determined at 212 that additional quantization is desired, then method 200 can optionally go to block 214, or, in other implementations, can simply return directly to block 204.

At 214, the computing system can re-train the remaining un-quantized parameters of the neural network (e.g., until convergence). For example, the neural network can be re-trained while holding the quantized parameters fixed. After 214, the method 200 can return to block 204.

FIG. 3 shows an example method 300 to evolve a neural network (e.g., to evolve a neural network of fixed sparsity).

At 302, a computing system can obtain data descriptive of a neural network. For example, the neural network can be a fully-connected neural network. The neural network can have been previously trained (e.g., to convergence) based on a training dataset.

At 304, the computing system can compute the gradient using backpropagation. At 306, the computing system can determine whether the parameters are nearly optimal. If it is determined at 304 that the parameters are not nearly optimal, then method 300 can proceed to 307 and again update the parameters (e.g., based on the gradient determined at 304). After 307, method 300 can return to 304.

However, if it is determined at 306 that the parameters are nearly optimal, then method 300 can proceed to 308. At 308, the computing system can determine whether an additional modification round is desired. For example, modification rounds can be performed until one or more criteria are met, such as, for example, performing modification rounds until a certain performance threshold is met.

If it is determined at 308 that no more modification rounds are desired, then method 300 can end. However, if it is determined at 308 that an additional modification round is desired, then method 300 can proceed to 310.

At 310, the computing system can estimate the utility of all edges. For example, the computing system can estimate the utility of all edges using the gradient computed at 12. As one example, the computing system can use the utility estimation heuristic described above to compute the utility for all edges.

At 312, the computing system can select and delete one or more edges based at least in part on the estimated utility of the edges. For example, a certain number of edges with the smallest estimated utility can be removed. As another example, a certain percentage of edges with the smallest estimated utility can be removed. As yet another example, any edges that have an estimated utility that is less than a threshold value can be removed.

At 314, the computing system can add one or more new edges to the neural network. As one example, at 314, the computing system can add a same number of edges as were deleted at 312. This can result in an evolving network with fixed sparsity.

Thus, method 300 is highly similar to method 100 of FIG. 1, except that after deleting the edges with lowest utility, the computing system adds new edges in other places. For example, after deleting edge 2→3, the computing system could add either edge 1→2, or 2→1. To decide which of the two candidate edges to add, any heuristic can be used. One possibility is to train a small network to make the decision regarding where to add the new edges.

After 314, method 300 can return to 304.

Example Devices and Systems

Figure 4A:
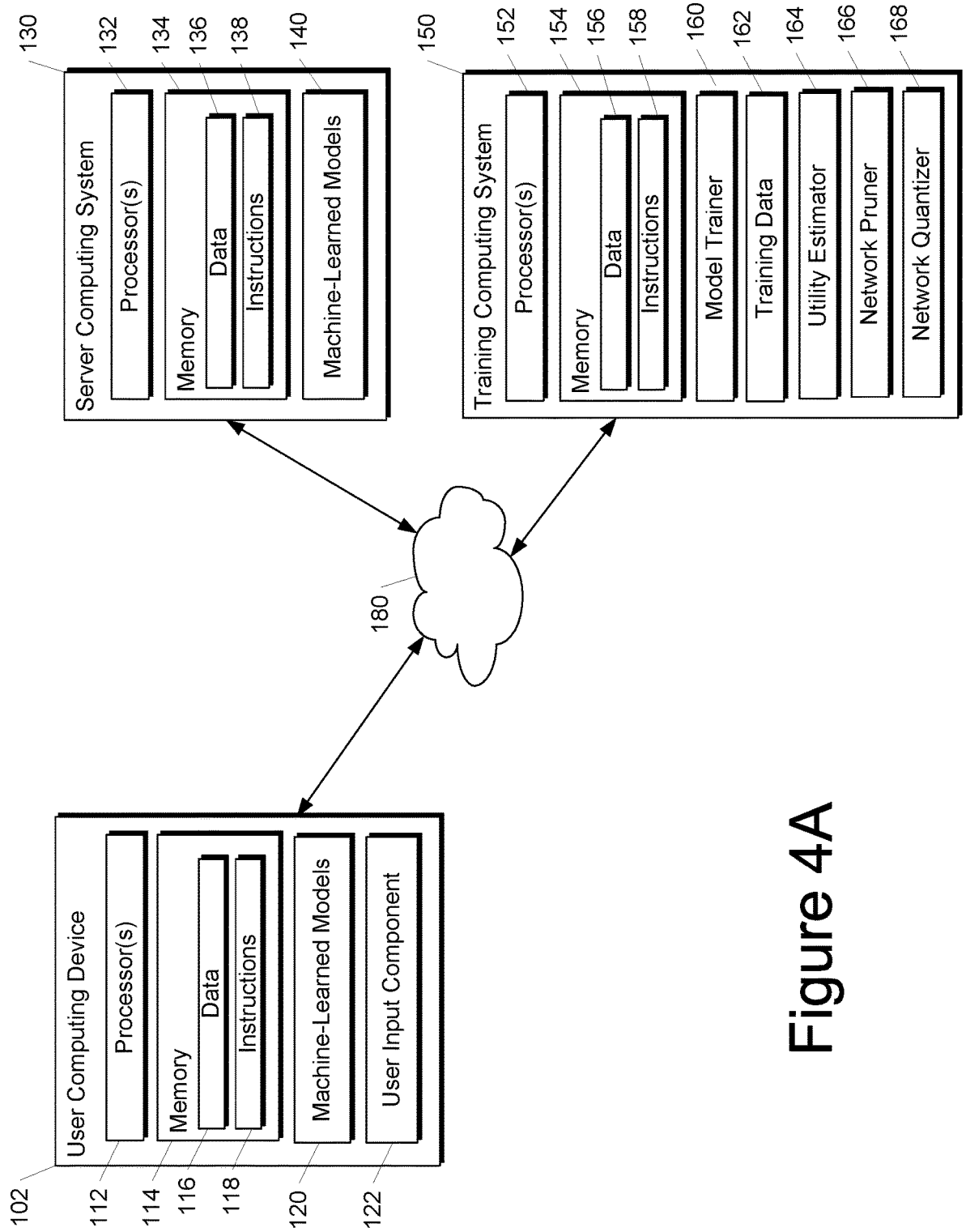
FIG. 4A depicts a block diagram of an example computing system according to example embodiments of the present disclosure.

FIG. 4A depicts a block diagram of an example computing system that performs modification of neural networks according to example embodiments of the present disclosure. The system includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), spiking neural networks, convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a neural network modification service). Thus, one or more models 120 can be stored and implemented at the user computing device 102 and/or one or more models 140 can be stored and implemented at the server computing system 130.

The user computing device 102 can also include one or more user input components 122 that receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, spiking neural networks, convolutional neural networks, layered or non-layered neural networks, and other forms of neural networks.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 142.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The training computing system 150 can further include a utility estimator 164, a network pruner 166, and a network quantizer 168. The utility estimator 164 can estimate the utility of one or more connections and/or parameters of a machine-learned model. For example, the utility estimator 164 can employ any of the techniques or heuristics described herein to estimate the utility of a connection or parameter such as an edge of a neural network. The network pruner 166 can perform one or more pruning algorithms on a machine-learned model. For example, the network pruner 166 can perform some or all of methods 100 and/or 300. In some implementations, the network pruner 166 can also add one or more new connections to a machine-learned model. The network quantizer 168 can perform one or more quantization algorithms on a machine-learned model. For example, the network quantizer 168 can perform some or all of method 200.

Each of the model trainer 160, the utility estimator 164, the network pruner 166, and the network quantizer 168 includes computer logic utilized to provide desired functionality. Each of the model trainer 160, the utility estimator 164, the network pruner 166, and the network quantizer 168 can be implemented in hardware, firmware, and/or software controlling a general purpose processor. For example, in some implementations, each of the model trainer 160, the utility estimator 164, the network pruner 166, and the network quantizer 168 includes program files stored on a storage device, loaded into a memory and executed by one or more processors. In other implementations, each of the model trainer 160, the utility estimator 164, the network pruner 166, and the network quantizer 168 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., protocol buffers, XML), and/or protection schemes (e.g., VPN, secure HTTP, SSL).

FIG. 4A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

More particularly, in various implementations, any components shown at one of device 102, system 130, or system 150 can be located at any other one of device 102, system 130, or system 150.

Figure 4B:
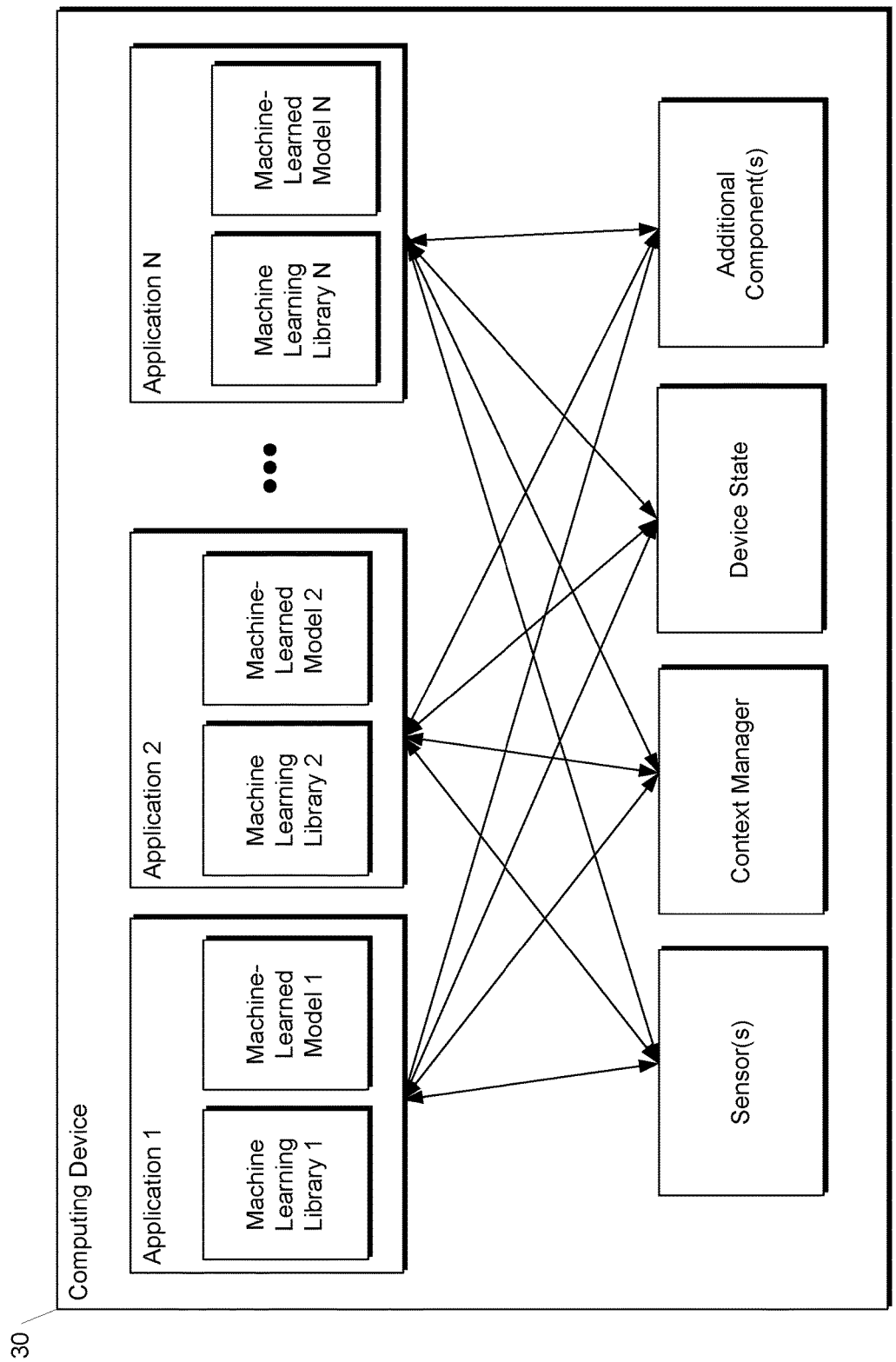
FIG. 4B depicts a block diagram of an example computing device according to example embodiments of the present disclosure.

FIG. 4B depicts a block diagram of an example computing device 30 according to example embodiments of the present disclosure. The computing device 30 can be a user computing device or a server computing device.

The computing device 30 includes a number of applications (e.g., applications 1 through N). Each application contains its own machine learning library and machine-learned model(s). For example, each application can include a machine-learned model.

As illustrated in FIG. 4B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 4C:
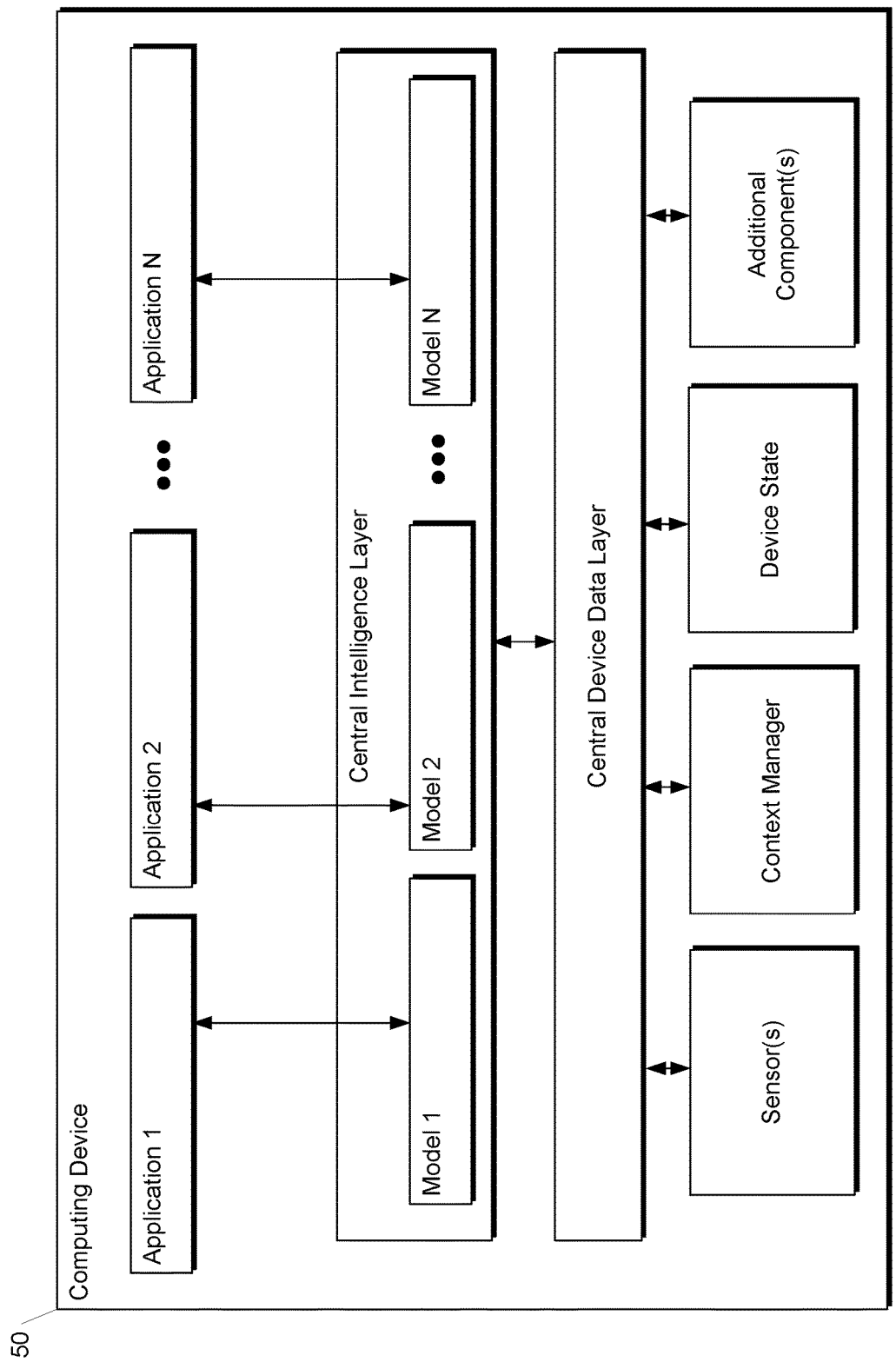
FIG. 4C depicts a block diagram of an example computing device according to example embodiments of the present disclosure.

FIG. 4C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. In some implementations, each application can communicate with the central intelligence layer (and model(s) stored therein) using an API (e.g., a common API across all applications).

The central intelligence layer includes a number of machine-learned models. For example, as illustrated in FIG. 4C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 4C, the central device data layer can communicate with a number of other components of the computing device, such as, for example, one or more sensors, a context manager, a device state component, and/or additional components. In some implementations, the central device data layer can communicate with each device component using an API (e.g., a private API).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method of reducing a memory footprint of a machine-learned neural network, the method comprising:
   obtaining, by a computing system comprising one or more processors, data descriptive of an initial plurality of weights of the machine-learned neural network, wherein a performance of the machine-learned neural network is characterized by a loss function;
   for each respective candidate quantization scheme of a plurality of different candidate quantization schemes, determining, by the computing system, sensitivity values for the initial plurality of weights, wherein the respective candidate quantization scheme is configured to change values of the initial plurality of weights other than by setting all the initial plurality of weights to be zero, wherein determining the sensitivity values comprises, for each respective weight of the initial plurality of weights:
      determining a change in the respective weight value based on an initial value of the respective weight and a quantized value of the respective weight;
      determining a respective change in a loss by multiplying the change in the respective weight value by a derivative of the loss function with respect to the initial value of the respective weight; and
      determining a respective sensitivity value for the respective weight by dividing the respective change in the loss by a magnitude of the initial value of the respective weight;
   selecting, by the computing system, one of the candidate quantization schemes based at least in part on the sensitivity values determined for the selected candidate quantization scheme and a cumulative sensitivity value determined for the selected candidate quantization scheme; and
   generating, by the computing system, a second plurality of weights by applying the selected one of the candidate quantization schemes to the initial plurality of weights, wherein the second plurality of weights provide a reduced-size parameterization of the machine-learned neural network.

2. The method of claim 1, wherein a set of weights associated with the reduced-size parameterization of the machine-learned neural network comprises a set of quantized weights and a set of un-quantized weights, wherein the set of quantized weights comprises the second plurality of weights.

3. The method of claim 2, comprising:
   retraining, by the computing system, the set of un-quantized weights while maintaining the set of quantized weights fixed.

4. The method of claim 3, comprising:
   for each respective candidate quantization scheme of the plurality of different candidate quantization schemes, determining, by the computing system, sensitivity values for the retrained set of un-quantized weights, wherein determining the sensitivity values for the retrained set of un-quantized weights comprises, for each respective retrained weight of the retrained set of un-quantized weights:
      determining a change in the respective retrained weight value based on an initial value of the respective retrained weight and a quantized value of the respective retrained weight;
      determining a respective change in a loss by multiplying the change in the respective retrained weight value by a derivative of the loss function with respect to the initial value of the respective retrained weight; and
      determining a respective sensitivity value for the respective retrained weight by dividing the respective change in the loss by a magnitude of the initial value of the respective retrained weight;
   selecting, by the computing system, one of the candidate quantization schemes for quantizing the retrained set of un-quantized weights based at least in part on the sensitivity values determined for the selected candidate quantization scheme for quantizing the retrained set of un-quantized weights; and
   generating, by the computing system, a third plurality of weights by applying the selected one of the candidate quantization schemes to the retrained set of un-quantized weights, wherein the third plurality of weights provide a further reduced-size parameterization of the machine-learned neural network.

5. The method of claim 4, comprising:
   iteratively performing, by the computing system, retraining and quantizing of the machine-learned neural network until satisfying a criterion based on a rate distortion curve.

6. A computing system comprising:
   one or more processors; and
   one or more non-transitory computer-readable media storing instructions that are executable to cause the computing system to perform operations for reducing a memory footprint of a machine-learned neural network, the operations comprising:
      obtaining data descriptive of an initial plurality of weights of the machine-learned neural network, wherein a performance of the machine-learned neural network is characterized by a loss function;
      for each respective candidate quantization scheme of a plurality of different candidate quantization schemes, determining sensitivity values for the initial plurality of weights, wherein the respective candidate quantization scheme is configured to change values of the initial plurality of weights other than by setting all the initial plurality of weights to be zero, wherein determining the sensitivity values comprises, for each respective weight of the initial plurality of weights:
         determining a change in the respective weight value based on an initial value of the respective weight and a quantized value of the respective weight;

determining a respective change in a loss by multiplying the change in the respective weight value by a derivative of the loss function with respect to the initial value of the respective weight; and determining a respective sensitivity value for the respective weight by dividing the respective change in the loss by a magnitude of the initial value of the respective weight;

selecting one of the candidate quantization schemes based at least in part on the sensitivity values determined for the selected candidate quantization scheme and a cumulative sensitivity value determined for the selected candidate quantization scheme; and generating a second plurality of weights by applying the selected one of the candidate quantization schemes to the initial plurality of weights, wherein the second plurality of weights provide a reduced-size parameterization of the machine-learned neural network.

7. The system of claim 6, wherein a set of weights associated with the reduced-size parameterization of the machine-learned neural network comprises a set of quantized weights and a set of un-quantized weights, wherein the set of quantized weights comprises the second plurality of weights.

8. The system of claim 7, wherein the operations comprise:
retraining the set of un-quantized weights while maintaining the set of quantized weights fixed.

9. The system of claim 8, wherein the operations comprise:
for each respective candidate quantization scheme of the plurality of different candidate quantization schemes, determining sensitivity values for the retrained set of un-quantized weights, wherein determining the sensitivity values for the retrained set of un-quantized weights comprises, for each respective retrained weight of the retrained set of un-quantized weights:
determining a change in the respective retrained weight value based on an initial value of the respective retrained weight and a quantized value of the respective retrained weight;
determining a respective change in a loss by multiplying the change in the respective retrained weight value by a derivative of the loss function with respect to the initial value of the respective retrained weight; and
determining a respective sensitivity value for the respective retrained weight by dividing the respective change in the loss by a magnitude of the initial value of the respective retrained weight;
selecting one of the candidate quantization schemes for quantizing the retrained set of un-quantized weights based at least in part on the sensitivity values determined for the selected candidate quantization scheme for quantizing the retrained set of un-quantized weights; and
generating a third plurality of weights by applying the selected one of the candidate quantization schemes to the retrained set of un-quantized weights, wherein the third plurality of weights provide a further reduced-size parameterization of the machine-learned neural network.

10. The system of claim 9, wherein the operations comprise:
iteratively retraining and quantizing the machine-learned neural network until satisfying a criterion based on a rate distortion curve.

11. One or more non-transitory computer-readable media storing instructions that are executable to cause a computing system to perform operations for reducing a memory footprint of a machine-learned neural network, the operations comprising:
obtaining data descriptive of an initial plurality of weights of the machine-learned neural network, wherein a performance of the machine-learned neural network is characterized by a loss function;
for each respective candidate quantization scheme of a plurality of different candidate quantization schemes, determining sensitivity values for the initial plurality of weights, wherein the respective candidate quantization scheme is configured to change values of the initial plurality of weights other than by setting all the initial plurality of weights to be zero, wherein determining the sensitivity values comprises, for each respective weight of the initial plurality of weights:
determining a change in the respective weight value based on an initial value of the respective weight and a quantized value of the respective weight;
determining a respective change in a loss by multiplying the change in the respective weight value by a derivative of the loss function with respect to the initial value of the respective weight; and
determining a respective sensitivity value for the respective weight by dividing the respective change in the loss by a magnitude of the initial value of the respective weight;
selecting one of the candidate quantization schemes based at least in part on the sensitivity values determined for the selected candidate quantization scheme and a cumulative sensitivity value determined for the selected candidate quantization scheme; and
generating a second plurality of weights by applying the selected one of the candidate quantization schemes to the initial plurality of weights, wherein the second plurality of weights provide a reduced-size parameterization of the machine-learned neural network.

12. The one or more non-transitory computer-readable media of claim 11, wherein a set of weights associated with the reduced-size parameterization of the machine-learned neural network comprises a set of quantized weights and a set of un-quantized weights, wherein the set of quantized weights comprises the second plurality of weights.

13. The one or more non-transitory computer-readable media of claim 12, wherein the operations comprise:
retraining the set of un-quantized weights while maintaining the set of quantized weights fixed.

14. The one or more non-transitory computer-readable media of claim 13, wherein the operations comprise:
for each respective candidate quantization scheme of the plurality of different candidate quantization schemes, determining sensitivity values for the retrained set of un-quantized weights, wherein determining the sensitivity values for the retrained set of un-quantized weights comprises, for each respective retrained weight of the retrained set of un-quantized weights:
determining a change in the respective retrained weight value based on an initial value of the respective retrained weight and a quantized value of the respective retrained weight;
determining a respective change in a loss by multiplying the change in the respective retrained weight value by a derivative of the loss function with respect to the initial value of the respective retrained weight; and determining a respective sensitivity value for the respective retrained weight by dividing the respective change in the loss by a magnitude of the initial value of the respective retrained weight;

selecting one of the candidate quantization schemes for quantizing the retrained set of un-quantized weights based at least in part on the sensitivity values determined for the selected candidate quantization scheme for quantizing the retrained set of un-quantized weights; and generating a third plurality of weights by applying the selected one of the candidate quantization schemes to the retrained set of un-quantized weights, wherein the third plurality of weights provide a further reduced-size parameterization of the machine-learned neural network.

15. The one or more non-transitory computer-readable media of claim 14, wherein the operations comprise:

iteratively retraining and quantizing the machine-learned neural network until satisfying a criterion based on a rate distortion curve.

\* \* \* \* \*